(12) United States Patent
Matsueda et al.

(10) Patent No.: US 9,675,970 B2
(45) Date of Patent: *Jun. 13, 2017

(54) EXHAUST CLEANING CATALYST (71) Applicant: CATALER CORPORATION, Kakegawa-shi, Shizuoka (JP)

(72) Inventors: Satoshi Matsueda, Kakegawa (JP); Akimasa Hirai, Kakegawa (JP); Kenichi Taki, Kakegawa (JP); Sho Hoshino, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/914,829

(22) PCT Filed: Dec. 9, 2014

(86) PCT No.: PCT/JP2014/082540
§ 371 (c)(1),
(2) Date: Feb. 26, 2016

(87) PCT Pub. No.: WO2015/087872
PCT Pub. Date: Jun. 18, 2015

(65) Prior Publication Data
US 2016/0199816 A1 Jul. 14, 2016

(30) Foreign Application Priority Data
Dec. 13, 2013 (JP) .................................. 2013-258649

(51) Int. Cl.
*B01J 23/10* (2006.01)
*B01J 23/40* (2006.01)
(Continued)

(52) U.S. Cl.
CPC .......... *B01J 35/006* (2013.01); *B01D 53/945* (2013.01); *B01J 23/002* (2013.01); *B01J 23/63* (2013.01);
(Continued)

(58) Field of Classification Search
CPC ... B01J 23/10; B01J 23/40; B01J 23/42; B01J 23/44; B01J 23/46; B01J 23/63
(Continued)

(56) References Cited

U.S. PATENT DOCUMENTS 5,597,771 A * 1/1997 Hu .................. B01D 53/945
502/303
6,764,665 B2 * 7/2004 Deeba ................. B01D 53/945
423/213.5
(Continued)

FOREIGN PATENT DOCUMENTS

EP 1 916 031 A1 4/2008
JP 2007-021456 A 2/2007
(Continued)

OTHER PUBLICATIONS

Mar. 17, 2015 International Search Report issued in International Patent Application No. PCT/JP2014/082540.

*Primary Examiner* — Cam N. Nguyen
(74) *Attorney, Agent, or Firm* — Oliff PLC (57) ABSTRACT

Provided is an exhaust cleaning catalyst that exhibits higher $NO_x$-reducing activities at the time of engine restart while maintaining its catalytic activities during normal traveling. This invention provides an exhaust cleaning catalyst including a substrate and a catalyst coating layer including $CeO_2$. Catalyst coating layer is constituted in its thickness direction with multiple coating layers. In a top coating layer located at the outermost surface, the $CeO_2$ content in a top coating layer's upstream portion is less than the $CeO_2$ content in a
(Continued)

top coating layer's downstream portion. In a bottom coating layer near substrate, the $CeO_2$ content in a bottom layer's downstream portion is less than the $CeO_2$ content in a bottom coating layer's upstream portion.

10 Claims, 2 Drawing Sheets

(51) Int. Cl.
    *B01J 23/42* (2006.01)
    *B01J 23/44* (2006.01)
    *B01J 23/46* (2006.01)
    *B01J 23/63* (2006.01)
    *B01J 35/00* (2006.01)
    *B01J 23/00* (2006.01)
    *B01D 53/94* (2006.01)
    *F01N 3/10* (2006.01)

(52) U.S. Cl.
    CPC ....... *B01J 35/0006* (2013.01); *B01J 35/0013* (2013.01); *B01D 2255/1021* (2013.01); *B01D 2255/1023* (2013.01); *B01D 2255/1025* (2013.01); *B01D 2255/2065* (2013.01); *B01D 2255/908* (2013.01); *B01D 2255/9022* (2013.01); *B01D 2255/9025* (2013.01); *B01D 2255/9032* (2013.01); *B01J 2523/00* (2013.01); *F01N 3/101* (2013.01); *F01N 2510/0682* (2013.01); *F01N 2510/0684* (2013.01); *Y02T 10/22* (2013.01)

(58) Field of Classification Search
    USPC ....... 502/304, 326, 327, 332–334, 339, 439, 502/527.12, 527.13
    See application file for complete search history.

(56) References Cited

U.S. PATENT DOCUMENTS

| | | | |
|---|---|---|---|
| 6,777,370 B2* | 8/2004 | Chen | B01D 53/945 502/241 |
| 7,517,510 B2* | 4/2009 | Chen | B01D 53/945 423/213.5 |
| 7,550,124 B2* | 6/2009 | Chen | B01D 53/945 422/168 |
| 7,758,834 B2* | 7/2010 | Chen | B01D 53/945 423/213.2 |
| 7,795,172 B2* | 9/2010 | Foong | B01D 53/945 502/302 |
| 8,617,496 B2* | 12/2013 | Wei | B01J 23/63 423/213.2 |
| 2003/0175192 A1* | 9/2003 | Hu | B01D 53/8637 423/239.1 |
| 2008/0044330 A1* | 2/2008 | Chen | B01D 53/945 423/213.5 |
| 2009/0124492 A1 | 5/2009 | Kitamura et al. | |
| 2010/0150792 A1 | 6/2010 | Kitamura et al. | |
| 2010/0215557 A1* | 8/2010 | Liu | B01D 53/945 423/213.5 |
| 2012/0216512 A1 | 8/2012 | Nishi et al. | |

FOREIGN PATENT DOCUMENTS

| | | |
|---|---|---|
| JP | 2007-038072 A | 2/2007 |
| JP | 2011-212639 A | 10/2011 |
| JP | 2012-040547 A | 3/2012 |

\* cited by examiner

EXHAUST CLEANING CATALYST

TECHNICAL FIELD

The present invention relates to an exhaust cleaning catalyst for cleaning exhaust expelled from an internal combustion engine.

The present application claims priority to Japanese Patent Application No. 2013-258649 filed on Dec. 13, 2013; and the entire contents of which are incorporated herein by reference.

BACKGROUND ART

In general, exhaust expelled from an engine of automobiles and the like comprises components such as hydrocarbons (HC), carbon monoxide (CO), nitrogen oxides ($NO_X$), etc. An exhaust cleaning catalyst to clean out these components from the exhaust is placed in the exhaust path from an internal combustion engine. Such exhaust cleaning catalyst is constructed with a catalyst coating layer formed on a substrate surface. The catalyst coating layer is constituted with a precious metal catalyst and a carrier that carries the precious metal catalyst.

For this type of exhaust cleaning catalyst (especially, gasoline engine exhaust cleaning catalyst), a so-called three-way catalyst is used. In the three-way catalyst, platinum (Pt), rhodium (Rh), palladium (Pd) and the like are used as precious metal catalysts. Among the precious metal catalysts, Pt and Pd contribute to the activity to clean (by oxidation) carbon hydrocarbons (HC) and carbon monoxide (CO) while Rh contributes to the activity to clean (by reduction) nitrogen oxides ($NO_X$).

The three-way catalyst is designed to effectively work in an exhaust gas atmosphere (or a "stoichiometric atmosphere" hereinafter) resulting from near-stoichiometric (theoretical) air-fuel ratio combustion. Thus, in richer exhaust (i.e. exhaust generated from combustion of a rich air-fuel mixture) than this as well as in the opposite, lean exhaust (i.e. exhaust generated from combustion of a lean air-fuel mixture), the activity of the three-way catalyst is lower than in the stoichiometric atmosphere.

Accordingly, to adjust (buffer) the atmosphere in the exhaust cleaning catalyst, as the carrier, an oxygen-storing/releasing material (or OSC (oxygen storage capacity) material hereinafter) comprising $CeO_2$ is used. The OSC material absorbs oxygen in oxygen-rich exhaust relative to the stoichiometric atmosphere (or a "lean atmosphere" hereinafter). The OSC material releases oxygen in exhaust generated from combustion of excess fuel with less oxygen (or a "rich atmosphere" hereinafter). Thus, it is effective in stably maintaining a stoichiometric atmosphere inside the catalyst.

Examples of conventional art literatures related to such exhaust cleaning catalyst include Patent Documents 1 to 4. The exhaust cleaning catalyst according to Patent Document 1 is formed on a substrate and has a first catalyst coating layer that comprises precious metal catalysts such as Pt and Pd as well as an OSC material such as $CeO_2$. It also comprises a Rh-containing second catalyst coating layer in an area in the first catalyst coating layer. The first catalyst coating layer has a first-stage portion with a higher OSC content and a second-stage portion with a lower OSC content. According to Patent Document 1, an exhaust cleaning catalyst having such construction, great $NO_X$-reducing (cleaning) activities can be obtained during normal traveling.

CITATION LIST

Patent Literature

[Patent Document 1] Japanese Patent Application Publication No. 2011-212639
[Patent Document 2] Japanese Patent Application Publication No. 2007-38072
[Patent Document 3] Japanese Patent Application Publication No. 2007-21456
[Patent Document 4] Japanese Patent Application Publication No. 2012-40547

SUMMARY OF INVENTION

Lately, to increase fuel efficiency of vehicles such as automobiles, development is underway for so-call economical cars such as hybrid vehicles and idling stop (stop-start) vehicles having features that make engines stop while idling. In these economical cars, engines frequently shut off when the cars make temporary stops during traveling and while waiting for traffic lights to change. This tends to bring about a lean atmosphere in the exhaust cleaning catalyst. In other words, the OSC material in the catalyst may continue to stay in a state having oxygen stored therein.

When the engine restarts, rich exhaust is generated. If such rich exhaust reaches the catalyst coating layer on the substrate, oxygen stored in the OSC material will be supplied to the precious metal catalyst (PGM). As a result, the $NO_X$-reducing activity may decrease, leading to formation of emissions. Thus, from economic cars that make frequent engine stops and restarts while in operation (during traveling), higher $NO_X$-reducing (cleaning) activities at the time of engine restart are in demand.

The present invention has been made to solve the problem described above. An objective thereof is to provide an exhaust cleaning catalyst capable of maintaining its catalytic activities during normal traveling and of producing higher $NO_X$-reducing (cleaning) activities at the time of engine restart in an economic car that makes frequent engine stops and restarts.

Upon many earnest studies from various angles, the present inventors have made the present invention capable of achieving the objective.

The exhaust cleaning catalyst according to the present invention is placed in an exhaust path from an internal combustion engine and cleans exhaust expelled from the internal combustion engine. The exhaust cleaning catalyst comprises a porous substrate and a catalyst coating layer formed on the porous substrate. The catalyst coating layer has a carrier and a precious metal catalyst carried by the carrier. The carrier comprises an OSC material that includes at least $CeO_2$. The catalyst coating layer is constituted in its thickness direction with multiple coating layers that includes at least two layers having different compositions. Herein, in its top coating layer forming the uppermost layer that is located at the outermost surface among the multiple coating layers, a top coating layer's upstream portion that includes at least 20% of the full length of the top coating layer from the exhaust entrance-side end along the exhaust flow direction is free of $CeO_2$, or the $CeO_2$ content therein is less than the $CeO_2$ content in a top coating layer's $CeO_2$-containing downstream portion that includes at least 20% of the full length of the top coating layer from the exhaust exit-side end along the exhaust flow direction. In its bottom coating layer forming the lowest layer that is located near the porous substrate among the multiple coating layers, a bottom coating layer's downstream portion that includes at least 20% of the full length of the bottom coating layer from the exhaust exit-side end along the exhaust flow direction is free of $CeO_2$, or the $CeO_2$ content therein is less than the $CeO_2$ content in a bottom coating layer's $CeO_2$-containing upstream portion that includes at least 20% of the full length of the bottom coating layer from the exhaust entrance-side end along the exhaust flow direction.

In the exhaust cleaning catalyst, the $CeO_2$ content in the top coating layer's upstream portion is lower than the $CeO_2$ content in the top coating layer's downstream portion. In other words, the top coating layer's upstream portion is free of $CeO_2$ or the $CeO_2$ content therein is less than the $CeO_2$ content in the top coating layer's downstream portion. According to such constitution, the $CeO_2$-containing OSC material stores a smaller amount of oxygen in the top coating layer's upstream portion at the time of engine restart. Accordingly, the exhaust air fuel ratio in the top coating layer's upstream portion can reach a stoichiometric atmosphere (a stoichiometric air-fuel ratio) as soon as possible. Thus, in an economic car that makes frequent engine stops and restarts during traveling, at the time of engine restart, $NO_X$ emissions can be reduced.

According to the exhaust cleaning catalyst, in the top coating layer's downstream portion and the bottom coating layer's upstream portion, because of the oxygen-releasing ability of $CeO_2$ (OSC material), the exhaust can be maintained as a stoichiometric atmosphere. Thus, in the top coating layer's downstream portion and in the bottom coating layer's upstream portion, the $NO_X$-reducing (cleaning) activities can be maintained and increased during normal traveling.

In the exhaust cleaning catalyst, the $CeO_2$ content in the bottom coating layer's downstream portion is lower than the $CeO_2$ content in the bottom coating layer's upstream portion. In other words, the bottom coating layer's downstream portion is free of $CeO_2$ or the $CeO_2$ content therein is less than the $CeO_2$ content in the bottom coating layer's upstream portion. By this, in the bottom coating layer's downstream portion, while obtaining greater inhibition of CO absorption, the selective reactivity to HC can be increased. As a result, the HC-cleaning activities can be increased during normal traveling.

From the above, according to the exhaust cleaning catalyst, while maintaining the catalytic activities during normal traveling, the $NO_X$-reducing (cleaning) activities can be increased at the time of engine restart in an economic car that makes frequent engine stops and restarts.

In a preferable embodiment of the exhaust cleaning catalyst of the present invention disclosed herein, the $CeO_2$ content per liter of catalyst volume in the catalyst coating layer is 10 g/L to 40 g/L. This can bring about a high level of catalytic activities.

In another preferable embodiment of the exhaust cleaning catalyst of the present invention disclosed herein, the $CeO_2$ content per liter of catalyst volume in the top coating layer's upstream portion is 0 g/L to 2 g/L. By this, in the top coating layer's upstream portion, the $NO_X$-reducing (cleaning) activities can be preferably increased at the time of engine restart in an economic car.

In another preferable embodiment of the exhaust cleaning catalyst of the present invention disclosed herein, the $CeO_2$ content per liter of catalyst volume in the bottom coating layer's downstream portion is 0 g/L to 2 g/L. By this, the HC-cleaning activities can be preferably increased.

In another preferable embodiment of the exhaust cleaning catalyst of the present invention disclosed herein, the $CeO_2$ content per liter of catalyst volume in the top coating layer's downstream portion and in the bottom coating layer's upstream portion is 4 g/L or greater, respectively. By this, preferable adjustment of the exhaust can be brought about by the OSC material. As a result, the $NO_X$-reducing (cleaning) activities and activities to clean other exhaust gases can be preferably maintained or increased.

In another preferable embodiment of the exhaust cleaning catalyst of the present invention disclosed herein, with the full length of the top coating layer in the exhaust flow direction being 100, the (upstream/downstream) ratio of length of top coating layer's upstream portion along this direction to length of top coating layer's downstream portion along this direction is 20/80 to 80/20.

In another preferable embodiment of the exhaust cleaning catalyst of the present invention disclosed herein, with the full length of the bottom coating layer in the exhaust flow direction being 100, the (upstream/downstream) ratio of length of bottom coating layer's upstream portion along this direction to length of bottom coating layer's downstream portion along this direction is 25/75 to 80/20.

This can reduce $NO_X$ emissions at the time of engine restart in an economical car while preferably maintaining or increasing the $NO_X$-cleaning activities during normal traveling. In addition, it can preferably increase even the HC-cleaning activities.

In another preferable embodiment of the exhaust cleaning catalyst of the present invention disclosed herein, the precious metal catalyst is at least one species of Pt, Pd or Rh. By the use of Pt and/or Pd with high oxidation catalytic activities as the precious metal catalyst, HC and CO in the exhaust can be preferably cleaned by oxidation. By the use of Rh with great reduction catalytic activities, $NO_X$ in the exhaust can be preferably cleaned by reduction.

In another preferable embodiment of the exhaust cleaning catalyst of the present invention disclosed herein, the top coating layer comprises Pd and Rh as the precious metal catalyst. According to such constitution, in the top coating layer, preferable three-way catalytic activities can be obtained. In other words, HC and CO in the exhaust can be cleaned by oxidation with Pd and $NO_X$ in the exhaust can be preferably cleaned by reduction with Rh.

In another preferable embodiment of the exhaust cleaning catalyst of the present invention disclosed herein, with the $CeO_2$ content in the top coating layer's downstream portion being 1, the $CeO_2$ content in the top coating layer's upstream portion is less than 0.3.

In another preferable embodiment of the exhaust cleaning catalyst of the present invention disclosed herein, with the $CeO_2$ content in the bottom coating layer's upstream portion being 1, the $CeO_2$ content in the bottom coating layer's downstream portion is less than 0.3.

This can bring about the effect of the present invention to a higher level.

DESCRIPTION OF EMBODIMENTS

Some embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

Described first is an exhaust cleaning system 1 having an exhaust cleaning catalyst 7 according to a typical embodiment of the present invention.

Figure 1:
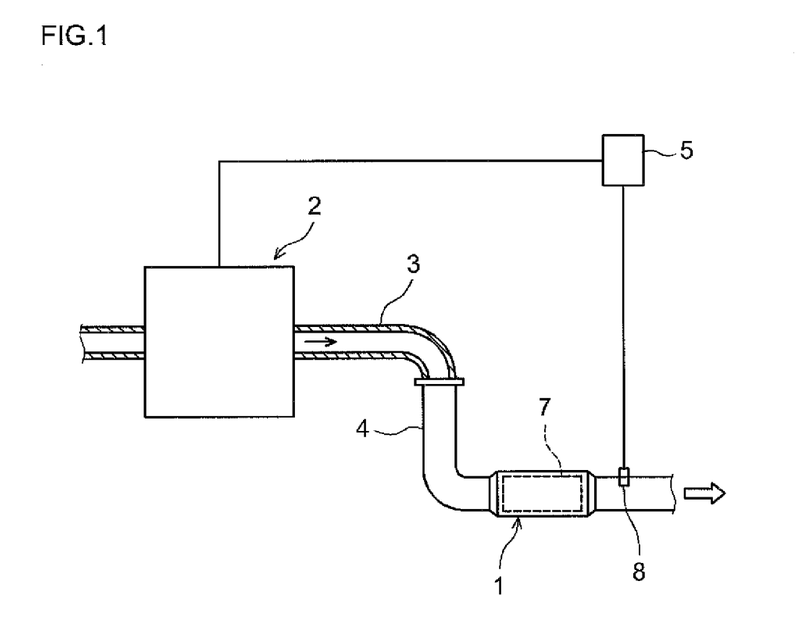
FIG. 1 shows a diagram schematically illustrating the exhaust cleaning system according to an embodiment.

FIG. 1 shows a diagram schematically illustrating exhaust cleaning system 1 according to this embodiment. As shown in FIG. 1, exhaust cleaning system 1 is installed in an exhaust system of an internal combustion engine 2.

To internal combustion engine (engine) 2 according to this embodiment, a mixture comprising oxygen and fuel gas is supplied. Internal combustion engine 2 burns the gas mixture and converts combustion energy to mechanical energy. The gas mixture burned here produces exhaust which is released to the exhaust system. Internal combustion engine 2 constructed as shown in FIG. 1 primarily comprises an automobile gasoline engine. The exhaust cleaning catalyst 7 disclosed herein is installed downstream of internal combustion engine 2, especially in an economical car such as a passenger vehicle with an idling-stop function (i.e. an idling-stop vehicle) and a hybrid vehicle among automobiles. This type of vehicle makes frequent engine stops during traveling (and during a temporary stop) and thus is preferable for implementing the present invention.

Described next is the exhaust system of internal combustion engine 2. To an exhaust port (not shown in the drawing) which allows internal combustion engine 2 to communicate with the exhaust system, an exhaust manifold 3 is joined. Exhaust manifold 3 is connected to an exhaust pipe 4 through which exhaust flows. Herein, exhaust manifold 3 and exhaust pipe 4 form the exhaust path in this embodiment. The arrow in the drawing indicates the direction of exhaust flow.

Exhaust cleaning system 1 cleans harmful components (e.g. carbon monoxide (CO), hydrocarbons (HC) and nitrogen oxides ($NO_X$)) in exhaust expelled from internal combustion engine 2. Herein, exhaust cleaning system 1 comprises an ECU 5 and an exhaust cleaning catalyst 7.

ECU 5 is an engine control unit that controls internal combustion engine 2 and exhaust cleaning system 1. Similarly to a general control system, ECU 5 comprises a digital computer and other electronics as components. Herein, ECU 5 is provided with input ports (not shown in the drawing) and is electrically connected to sensors (e.g. a pressure sensor 8) placed in internal combustion engine 2 and exhaust cleaning system 1, respectively. Because of this, information detected by the respective sensors is communicated as electrical signals via the input ports to ECU 5. ECU 5 is also provided with output ports (not shown in the drawing). ECU 5 is connected via the output ports to internal combustion engine 2 and exhaust cleaning system 1, respectively, and it controls the operation of the respective components by sending control signals.

Described next in detail is exhaust cleaning catalyst 7 suggested herein. Exhaust cleaning catalyst 7 is placed in the exhaust path of internal combustion engine 2 and cleans the exhaust expelled from internal combustion engine 2. Exhaust cleaning catalyst 7 is provided to exhaust pipe 4 through which the exhaust flows. In particular, exhaust cleaning catalyst 7 is provided on the downstream side of exhaust pipe 4 as shown in FIG. 1.

Figure 2:
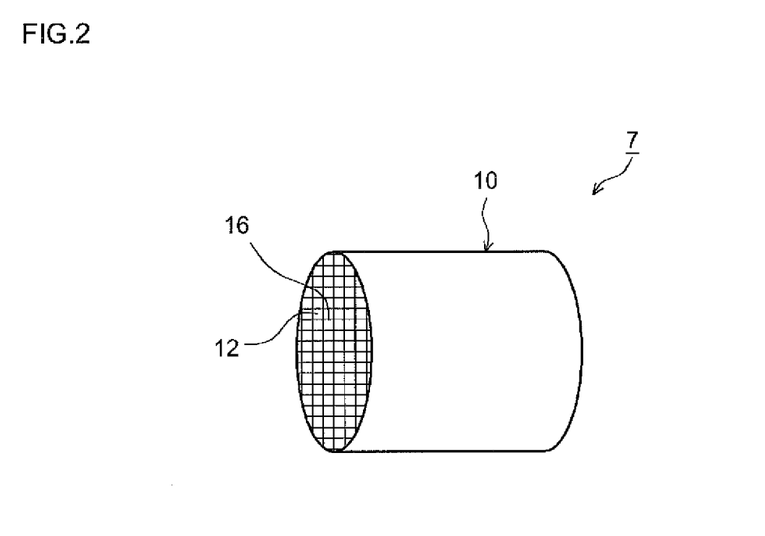
FIG. 2 shows a perspective view schematically illustrating a substrate for the exhaust cleaning catalyst.
Figure 3:
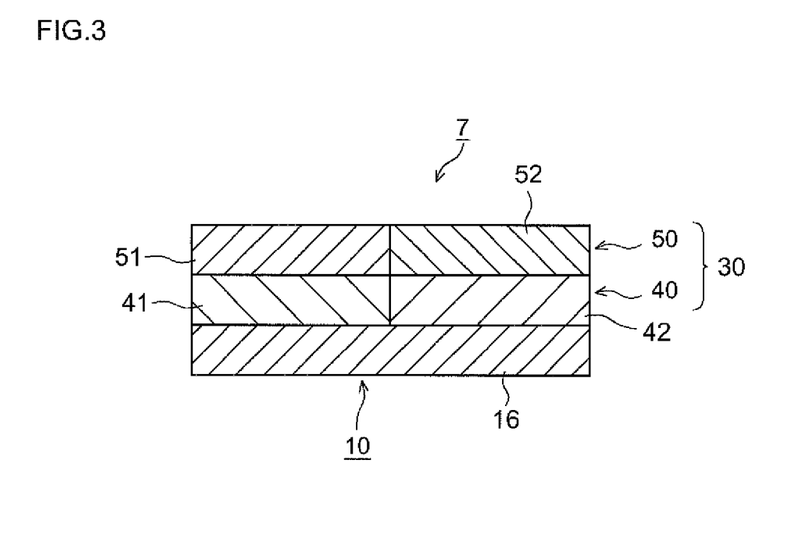
FIG. 3 shows a diagram schematically illustrating in large scale the cross-sectional construction of the exhaust cleaning catalyst according to an embodiment.

FIG. 2 shows a perspective view schematically illustrating a substrate 10 in exhaust cleaning catalyst 7. FIG. 3 shows a diagram schematically illustrating in enlarged scale the cross-sectional construction of exhaust cleaning catalyst 7. As shown in FIG. 2 and FIG. 3, exhaust cleaning catalyst 7 comprises substrate 10 and a catalyst coating layer 30.

<Substrate 10>

As shown in FIG. 2, substrate 10 is porous. For substrate 10, various forms of various materials conventionally used for this type of purpose can be used. Substrate 10 is preferably constituted with a heat-resistant material having a porous structure. Examples of such heat-resistant materials include cordierite, silicon carbide (SiC), aluminum titanate, silicon nitride, heat-resistant metals such as stainless steel and the like, and their alloys, etc. Herein, for example, substrate 10 is shown, having a cylindrical external shape in a honeycomb structure formed of regularly arranged cells (voids) 12 and cordierite partitions 16 separating the cells 12. The external shape of the entire substrate 10 is not particularly limited. An elliptic cylindrical shape, polygonal cylindrical shape, etc., can be adopted as well.

Substrate 10 has a volume (total cell volume, total bulk volume) of usually 0.1 L or greater (preferably 0.5 L or greater). For instance, it can be 5 L or less (preferably 3 L or less, more preferably 2 L or less, e.g. 1 L or less). Substrate 10 has a full length in the stretch direction (a full length in the exhaust flow direction) of usually about 10 mm to 500 mm (typically 50 mm to 300 mm, e.g. 100 mm to 200 mm).

<Catalyst Coating Layer 30>

Catalyst coating layer 30 is formed on substrate 10. In an example shown in FIG. 3, catalyst coating layer 30 is formed over partitions 16 that separate adjacent cells 12 (see FIG. 2). Catalyst coating layer 30 has a carrier and a precious metal catalyst carried by the carrier. Harmful components in the exhaust expelled from internal combustion engine 2 are cleaned upon making contact with catalyst coating layer 30. For example, CO and HC in the exhaust can be oxidized by catalyst coating layer 30 and converted (cleaned) to carbon dioxide ($CO_2$) and water ($H_2O$), etc. $NO_X$ can be reduced by catalyst coating layer 30 and converted (cleaned) to nitrogen ($N_2$).

Catalyst coating layer 30 comprises, as the carrier, an OSC material (oxygen storing/releasing material) comprising $CeO_2$ at least partially. The $CeO_2$ content is able to store and release oxygen and thus can stably maintain the exhaust air-fuel ratio. The $CeO_2$-containing OSC material comprising is not particularly limited. For example, it can be ceria by itself or a ceria-zirconia composite oxide (CZ composite oxide) that comprises $CeO_2$ as a solid solution. From the standpoint of increasing the physical (mechanical) properties, a preferable OSC material is formed of a CZ composite oxide. The form (appearance) of the carrier is not particularly limited. It preferably has a form that yields a large specific surface area. For instance, the carrier has a specific surface area (determined by the BET method; the same applies hereinafter) of preferably 20 m$^2$/g to 100 m$^2$/g, or more preferably 40 m$^2$/g to 80 m$^2$/g. A form preferable for obtaining a carrier having such a specific surface area is a powder form (a particulate form). To obtain a carrier having a more preferable specific surface area, the CZ composite oxide in a powder form may have an average particle diameter (e.g. an average primary particle diameter based on SEM or TEM observations) of, for instance, 5 nm to 20 nm or preferably 7 nm to 12 nm. With the particles having an excessively large average particle diameter (or an excessively small specific surface area), when placing the precious metal catalyst over the carrier, the precious metal tends to be less dispersive, possibly leading to lower cleaning activities of the catalyst. On the other hand, with the particles having an excessively small particle diameter (or an excessively large specific surface area), the heat resistance of the carrier itself may degrade, possibly leading to lower heat resistance of the catalyst.

Catalyst coating layer 30 may have, as the carrier, another inorganic compound in combination with the CeO$_2$-containing OSC material (e.g. a CZ composite oxide). The other inorganic compound preferably has a relatively large specific surface area. Preferable examples include alumina (Al$_2$O$_3$), zirconia (ZrO$_2$), silica (SiO$_2$) and titania (TiO$_2$). From the standpoint of the heat resistance and structural stability, the carrier particles may have a specific surface area of about 20 m$^2$/g to 200 m$^2$/g. The carrier particles may have an average particle diameter (e.g. an average primary particle diameter based on SEM or TEM observations) of typically about 1 nm to 500 nm (e.g. 10 nm to 200 nm).

To the carrier of catalyst coating layer 30, other materials may be added as secondary components. Examples of the materials that can be added to the carrier include rare earth elements such as lanthanum (La) and yttrium (Y), alkaline earth metals such as calcium, and other transition metals, and the like. Among them, rare earth elements such as lanthanum and yttrium are preferable as stabilizing agents because they can increase the specific surface area at a high temperature without hindering the catalytic activities.

As the precious metal catalyst carried by the carrier in catalyst coating layer 30, at least one species of platinum (Pt), palladium (Pd) or rhodium (Rh) is preferable. For instance, a three-way catalyst comprising Pd and Rh is preferable. Catalyst coating layer 30 may comprise other precious metal catalyst(s) besides Pt, Pd and Rh constituting the three-way catalyst. Examples of the precious metal(s) other than Pt, Pd and Rh include ruthenium (Ru), iridium (Ir), osmium (Os), etc.

Catalyst coating layer 30 is constituted in its thickness direction with multiple coating layers that includes two or more layers having different compositions. In other words, the thickness of catalyst coating layer 30 is divided into multiple layers. In this embodiment, catalyst coating layer 30 is constituted with two layers, namely, a bottom coating layer 40 and a top coating layer 50.

<Bottom Coating Layer 40>

Bottom coating layer 40 is a layer (the lowest layer) closest to substrate 10 (typically to partitions 16) among the multiple coating layers. Bottom coating layer 40 has an average thickness of suitably about 20 μm to 500 μm, for instance, preferably about 50 μm to 200 μm. Bottom coating layer 40 has a bottom coating layer's upstream portion 41 and a bottom coating layer's downstream portion 42.

The bottom coating layer's upstream portion 41 includes at least 20% of the full length of bottom coating layer 40 from its exhaust entrance-side end along the exhaust flow direction. Preferably, the bottom coating layer's upstream portion 41 accounts for 25% to 80% (e.g. about 50%±10%) of the full length of bottom coating layer 40 from its exhaust entrance-side end along the flow direction.

The bottom coating layer's upstream portion 41 comprises an OSC material including CeO$_2$.

The bottom coating layer's downstream portion 42 includes at least 20% of the full length of bottom coating layer 40 from its exhaust exit-side end along the exhaust flow direction. Preferably, the bottom coating layer's downstream portion 42 accounts for 20% to 75% (e.g. about 50%±10%) of the full length of bottom coating layer 40 from its exhaust exit-side end along the flow direction.

With the full length of bottom coating layer 40 along the exhaust flow direction being 100, the (upstream/downstream) ratio of length of bottom coating layer's upstream portion 41 along this direction to length of bottom coating layer's downstream portion 42 along this direction is preferably 25/75 to 80/20.

The bottom coating layer's downstream portion 42 is preferably free of CeO$_2$, or even if CeO$_2$ is contained, the CeO$_2$ content therein is preferably significantly smaller in comparison with the bottom coating layer's upstream portion 41. For instance, with the CeO$_2$ content in the bottom coating layer's upstream portion 41 being 1, the CeO$_2$ content in the bottom coating layer's downstream portion 42 can be below 0.5, or typically below 0.3, for instance, 0 to 0.29. This can further increase the NO$_X$-reducing (cleaning) activities at the time of engine restart. Thus, the effect of the present invention can be produced more notably.

The precious metal catalyst carried by the carrier in bottom coating layer 40 (bottom coating layer's upstream portion 41 and bottom coating layer's downstream portion 42) is not particularly limited. For instance, Pd, Pt, Rh and the like that form a three-way catalyst can be carried. Herein, it preferably comprises a catalyst highly active in reduction, such as Rh. The precious metal catalyst (e.g. Rh) content per liter of catalyst volume in bottom coating layer 40 can be generally 0.001 g/L to 2 g/L (typically 0.01 g/L to 1 g/L, e.g. 0.1 g/L to 0.5 g/L).

<Top Coating Layer 50>

Top coating layer 50 is the uppermost layer among the multiple coating layers, located at the outermost surface. When catalyst coating layer 30 has a two-layer structure such as in this embodiment, top coating layer 50 is formed on bottom coating layer 40 formed over partitions 16. The average thickness of top coating layer 50 is, but not particularly limited to, suitably about 20 μm to 500 μm, or preferably, for instance, about 50 μm to 200 μm. Top coating layer 50 has a top coating layer's upstream portion 51 and a top coating layer's downstream portion 52.

The top coating layer's upstream portion 51 includes at least 20% of the full length of top coating layer 50 along the exhaust flow direction from the exhaust entrance-side end. Preferably, the top coating layer's upstream portion 51 accounts for 20% to 80% (e.g. 50%±10%) of the full length of top coating layer 50 along the flow direction from the exhaust entrance-side end.

The bottom coating layer's upstream portion 51 is preferably free of CeO$_2$, or even if CeO$_2$ is contained, the CeO$_2$ content therein is preferably significantly smaller in comparison with the bottom coating layer's downstream portion 52. For instance, with the CeO$_2$ content in the bottom coating layer's downstream portion 52 being 1, the CeO$_2$ content in the bottom coating layer's upstream portion 51 can be below 0.5, or typically below 0.3, for instance, 0 to 0.29. This can further increase the NO$_X$-reducing (cleaning)

activities at the time of engine restart. Thus, the effect of the present invention can be produced more notably.

The top coating layer's downstream portion 52 includes at least 20% of the full length of top coating layer 50 along the exhaust flow direction from the exhaust exit-side end. Preferably, the top coating layer's downstream portion 51 accounts for 20% to 80% (e.g. about 50%±10%) of the full length of top coating layer 50 along the flow direction from the exhaust exit-side end.

With the full length of top coating layer 50 in the exhaust flow direction being 100, the (upstream/downstream) ratio of length of top coating layer's upstream portion along this direction to length of top coating layer's downstream portion along this direction is preferably 20/80 to 80/20.

The top coating layer's bottom portion 51 comprises an OSC material including $CeO_2$.

The precious metal catalyst carried by the carrier in top coating layer 50 (top coating layer's upstream portion 51 and top coating layer's downstream portion 52) is not particularly limited. For instance, Pd, Pt, Rh and the like that form a three-way catalyst can be used. Herein, as the precious metal catalyst, Pd which is highly active in oxidation and Rh which is highly active in reduction are preferably contained. The precious metal catalyst (e.g. Pd) content per liter of catalyst volume in top coating layer 50 can be generally 0.001 g/L to 10 g/L (typically 0.01 g/L to 5 g/L). Herein, the precious metal catalyst (e.g. Pd) content per liter of catalyst volume in each of the top coating layer's upstream portion 51 and top coating layer's downstream portion 52 can be generally 0.001 g/L to 5 g/L (preferably 0.005 g/L to 2.5 g/L). When a catalyst highly active in reduction such as Rh is included in addition to a catalyst highly active in oxidation such as Pd, the reduction catalyst (e.g. Rh) content per liter of catalyst volume in top coating layer 50 can be generally 0.001 g/L to 5 g/L (typically 0.01 g/L to 2.5 g/L).

<$CeO_2$ Content>

Described next is the $CeO_2$ content as the OSC material in catalyst coating layer 30. The $CeO_2$ content per liter of catalyst volume in catalyst coating layer 30 is preferably about 10 g/L to 40 g/L. This can bring about a higher level of catalytic activities. It can also inhibit sintering and grain growth of the precious metal catalyst and bring about excellent catalytic activities over a longer term. In addition, it is also preferable in terms of cost reduction and resource saving.

As described above, in this invention, the $CeO_2$ content in the top coating layer's upstream portion 51 is less than the $CeO_2$ content in the top coating layer's downstream portion 52. The $CeO_2$ content in the bottom coating layer's downstream portion 42 is less than the $CeO_2$ content in the bottom coating layer's upstream portion 41. In an example, the $CeO_2$ content in the top coating layer's upstream portion 51 is less than the $CeO_2$ content in the bottom coating layer's upstream portion 41 in the bottom coating layer 40. In another example, the $CeO_2$ content in the bottom coating layer's downstream portion 42 is less than the $CeO_2$ content in the top coating layer's downstream portion 52. These can be reworded as the $CeO_2$ content in the top coating layer's downstream portion 52 and the bottom coating layer's upstream portion 41 being possibly greater than the $CeO_2$ content in the top coating layer's upstream portion 51 and the bottom coating layer's downstream portion 42, respectively.

The $CeO_2$ content per liter of catalyst volume in the top coating layer's upstream portion 51 and the $CeO_2$ content in the bottom coating layer's downstream portion 42 are each preferably about 0 g/L to 2 g/L. The $CeO_2$ content can be the same or different between the top coating layer's upstream portion 51 and the bottom coating layer's downstream portion 42. The $CeO_2$ content per liter of catalyst volume in the top coating layer's downstream portion 52 and the $CeO_2$ content in the bottom coating layer's upstream portion 41 is preferably 4 g/L or greater. The upper limit of $CeO_2$ content per liter of catalyst volume in the top coating layer's downstream portion 52 and the bottom coating layer's upstream portion 41 is preferably, but not particularly limited to, 20 g/L each (e.g. 10 g/L or less each). It is noted, however, that the $CeO_2$ content can be the same or different between the top coating layer's downstream portion 52 and the bottom coating layer's upstream portion 41.

In an economic car installed with the exhaust cleaning catalyst 7 disclosed herein, the exhaust path is filled with a lean atmosphere at the time of engine restart. The top coating layer's upstream portion 51 is free of $CeO_2$ or the $CeO_2$ content therein (herein, 0 g to 2 g per liter of catalyst volume) is less than the $CeO_2$ content (herein, 4 g or greater per liter of catalyst volume) in the top coating layer's downstream portion 52. Because of this, at the time of engine restart, a smaller amount of oxygen is stored in the $CeO_2$. As a result, the atmosphere inside the catalyst can quickly become stoichiometric. Thus, even at the time of engine restart in an economic car, $NO_X$ emissions can be greatly reduced in the top coating layer's upstream portion 51.

On the other hand, the $CeO_2$ content in the top coating layer's downstream portion 52 is greater than the $CeO_2$ content in the top coating layer's upstream portion 51; and the $CeO_2$ content in the bottom coating layer's upstream portion 41 is greater than the $CeO_2$ content in the bottom coating layer's downstream portion 42. Thus, by the oxygen-releasing abilities of the $CeO_2$ content in the top coating layer's downstream portion 52 and in the bottom coating layer's upstream portion 41, during normal traveling, the exhaust drawn into the catalyst can be maintained as a stoichiometric atmosphere. In other words, in the top coating layer's downstream portion 52 and bottom coating layer's upstream portion 41, the $NO_X$-reducing (cleaning) activities can be maintained during normal traveling.

The bottom coating layer's downstream portion 42 is free of $CeO_2$ or the $CeO_2$ content therein is less than the $CeO_2$ content in the bottom coating layer's upstream portion 41. Thus, in the bottom coating layer's downstream portion 42, while obtaining greater inhibition of CO absorption, the selective reactivity to HC can be increased. As a result, in the bottom coating layer's downstream portion 42, the HC-cleaning activities can be increased during normal traveling.

From the above, according to the exhaust cleaning catalyst 7 disclosed herein, while maintaining the catalytic activities during normal traveling, increased $NO_X$-reducing (cleaning) activities can be obtained at the time of engine restart.

Figure 4:
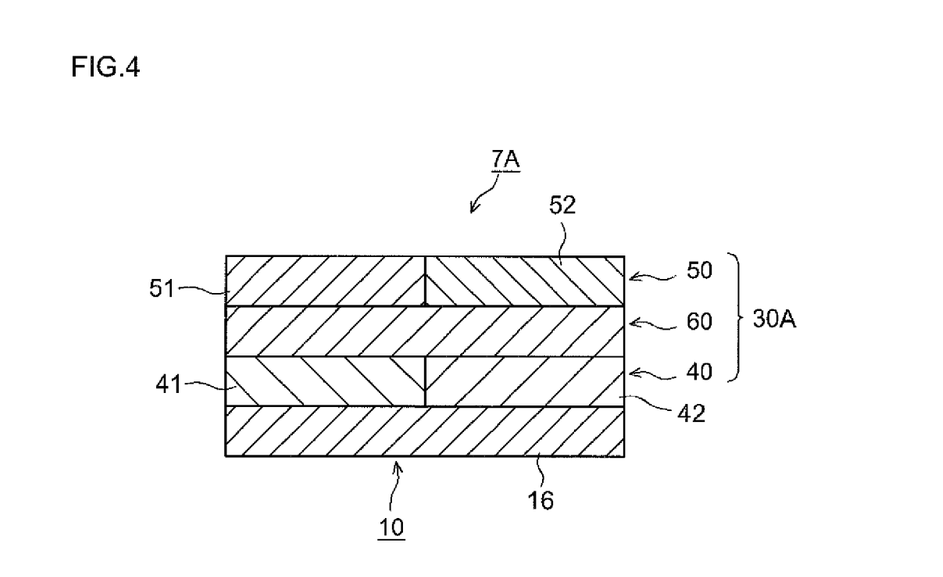
FIG. 4 shows a diagram schematically illustrating in large scale the cross-sectional construction of the exhaust cleaning catalyst according to another embodiment.

Exhaust cleaning catalyst 7 according to a preferable embodiment of the present invention is described above. The exhaust cleaning catalyst according to this invention is, however, not limited to this embodiment. For instance, as for another embodiment, it can be an exhaust cleaning catalyst 7A as shown in FIG. 4. As shown in FIG. 4, exhaust cleaning catalyst 7A according to this embodiment has a catalyst coating layer 30A having a three-layer structure (or a multiple-layer structure that includes more than three layers).

In other words, as shown in FIG. 4, catalyst coating layer 30A according to this embodiment comprises a bottom coating layer 40, a top coating layer 50 and a middle coating layer 60 placed between the two.

The middle coating layer 60 preferably comprises an OSC material having at least $CeO_2$. The $CeO_2$ is preferably present, for instance, as a CZ composite oxide. The $CeO_2$ content in middle coating layer 60 is not particularly limited. The $CeO_2$ content per liter of catalyst volume in catalyst coating layer 30A—that is, the total $CeO_2$ content of the bottom coating layer 40, top coating layer 50 and middle coating layer 60 combined—is preferably about 10 g/L to 40 g/L.

The catalyst carried in the middle coating layer 60 is, but not particularly limited to, for instance, Pt, Pd, Rh and the like that form a three-way catalyst.

Described next are some tested examples related to the present invention. However, the exhaust cleaning catalyst according to this invention is not to be limited to the tested examples shown below. Herein, as tested examples, catalyst samples were obtained for exhaust cleaning catalysts according to Examples 1 to 12 and Comparative Examples 1 to 11. The respective Examples and Comparative Examples are described below.

Example 1

The exhaust cleaning catalyst of Example 1 has a two-layer structure.

First, a substrate was obtained, having 900 cpsi (cells per square inch), a volume (referring to the entire catalyst volume including the volume of the cell aisles) of 1 L and a full length of 100 mm.

Were mixed 25 g of a CZ composite oxide mixed with $La_2O_3$ and $Nd_2O_3$ as a carrier ($CeO_2$:$ZrO_2$:$La_2O_3$:$Nd_2O_3$=28:65:2:5 (% by weight)) ($CeO_2$ content: 7 g), 25 g of alumina and an aqueous rhodium nitrate solution with 0.2 g of Rh to prepare a bottom coating layer's upstream portion slurry.

Were mixed 50 g of alumina as a carrier and an aqueous rhodium nitrate solution with 0.2 g of Rh to prepare a bottom coating layer's downstream portion slurry.

Were mixed 50 g of alumina as a carrier, an aqueous palladium nitrate solution with 1 g of Pd and an aqueous rhodium nitrate solution with 0.05 g of Rh to prepare a top coating layer's upstream portion slurry.

Were mixed 25 g of a CZ composite oxide mixed with $La_2O_3$ and $Nd_2O_8$ as a carrier ($CeO_2$:$ZrO_2$:$La_2O_3$:$Nd_2O_3$=28:65:2:5 (% by weight)) ($CeO_2$ content: 7 g), 25 g of alumina, an aqueous palladium nitrate solution with 1 g of Pd and an aqueous rhodium nitrate solution with 0.05 g of Rh to prepare a top coating layer's downstream portion slurry.

Subsequently, the whole amount of the bottom coating layer's upstream portion slurry was applied to an area of a substrate up to 50 mm from its exhaust entrance-side end towards its exhaust exit-side end, allowed to dry at a temperature of 250° C. for one hour, and calcined at a temperature of 500° C. for one hour to form a bottom coating layer's upstream portion on the substrate.

The whole amount of the bottom coating layer's downstream portion slurry was applied to an area of the substrate up to 50 mm from its exhaust exit-side end towards its exhaust entrance-side end, allowed to dry at a temperature of 250° C. for one hour, and calcined at a temperature of 500° C. for one hour to form a bottom coating layer's downstream portion on the substrate.

The whole amount of the top coating layer's upstream portion slurry was applied to an area of the substrate up to 50 mm from its exhaust entrance-side end towards its exhaust exit-side end, allowed to dry at a temperature of 250° C. for one hour, and calcined at a temperature of 500° C. for one hour to form a top coating layer's upstream portion on the substrate.

The whole amount of the top coating layer's downstream portion slurry was applied to an area of the substrate up to 50 mm from its exhaust exit-side end towards its exhaust entrance-side end, allowed to dry at a temperature of 250° C. for one hour, and calcined at a temperature of 500° C. for one hour to form a top coating layer's downstream portion on the substrate.

The exhaust cleaning catalyst thus obtained was used as a catalyst sample of Example 1.

Example 2

The procedure for fabricating the exhaust cleaning catalyst in Example 1 was carried out in the same manner as Example 1 except for the following and the resulting exhaust cleaning catalyst was used as a catalyst sample of Example 2.

In the step of preparing the bottom coating layer's downstream portion slurry, the bottom coating layer's downstream portion slurry was a mixture of 25 g of a CZ composite oxide mixed with $La_2O_3$ and $Y_2O_3$ ($CeO_2$:$ZrO_2$:$La_2O_3$:$Y_2O_3$=4:90:3:3 (% by weight)) ($CeO_2$ content: 1 g), 25 g of alumina and an aqueous rhodium nitrate solution with 0.2 g of Rh.

In the step of preparing the top coating layer's upstream portion slurry, the top coating layer's upstream portion slurry was a mixture of 25 g of a CZ composite oxide mixed with $La_2O_3$ and $Y_2O_3$ ($CeO_2$:$ZrO_2$:$La_2O_3$:$Y_2O_3$=4:90:3:3 (% by weight)) ($CeO_2$ content: 1 g), 25 g of alumina, an aqueous palladium nitrate solution with 1 g of Pd and an aqueous rhodium nitrate solution with 0.05 g of Rh.

Example 3

The procedure for fabricating the exhaust cleaning catalyst in Example 1 was carried out in the same manner as Example 1 except for the following and the resulting exhaust cleaning catalyst was used as a catalyst sample of Example 3.

In the step of preparing the bottom coating layer's downstream portion slurry, the bottom coating layer's downstream portion slurry was a mixture of 25 g of a CZ composite oxide mixed with $La_2O_3$ and $Y_2O_3$ ($CeO_2$:$ZrO_2$:$La_2O_3$:$Y_2O_3$=8:86:3:3 (% by weight)) ($CeO_2$ content: 2 g), 25 g of alumina and an aqueous rhodium nitrate solution with 0.2 g of Rh.

In the step of preparing the top coating layer's upstream portion slurry, the top coating layer's upstream portion slurry was a mixture of 25 g of a CZ composite oxide mixed with $La_2O_3$ and $Y_2O_3$ ($CeO_2$:$ZrO_2$:$La_2O_3$:$Y_2O_3$=8:86:3:3 (% by weight)) ($CeO_2$ content: 2 g), 25 g of alumina, an aqueous palladium nitrate solution with 1 g of Pd and an aqueous rhodium nitrate solution with 0.05 g of Rh.

Example 4

The procedure for fabricating the exhaust cleaning catalyst in Example 2 was carried out in the same manner as Example 2 except for the following and the resulting exhaust cleaning catalyst was used as a catalyst sample of Example 4.

In the step of preparing the bottom coating layer's upstream portion slurry, the bottom coating layer's upstream portion slurry was a mixture of 25 g of a CZ composite oxide mixed with $La_2O_3$ and $Y_2O_3$ ($CeO_2$:$ZrO_2$:$La_2O_3$:$Y_2O_3$=16:78:3:3 (% by weight)) ($CeO_2$ content: 4 g), 25 g of alumina and an aqueous rhodium nitrate solution with 0.2 g of Rh.

In the step of preparing the top coating layer's downstream portion slurry, the top coating layer's downstream portion slurry was a mixture of 25 g of a CZ composite oxide mixed with $La_2O_3$ and $Y_2O_3$ ($CeO_2$:$ZrO_2$:$La_2O_3$:$Y_2O_3$=16:78:3:3 (% by weight)) ($CeO_2$ content: 4 g), 25 g of alumina, an aqueous palladium nitrate solution with 1 g of Pd and an aqueous rhodium nitrate solution with 0.05 g of Rh.

Example 5

The procedure for fabricating the exhaust cleaning catalyst in Example 2 was carried out in the same manner as Example 2 except for the following and the resulting exhaust cleaning catalyst was used as a catalyst sample of Example 5.

In the step of preparing the bottom coating layer's upstream portion slurry, the bottom coating layer's upstream portion slurry was a mixture of 25 g of a CZ composite oxide mixed with $La_2O_3$ and $Nd_2O_3$ ($CeO_2$:$ZrO_2$:$La_2O_3$:$Nd_2O_3$=44:49:2:5 (% by weight)) ($CeO_2$ content: 11 g), 25 g of alumina and an aqueous rhodium nitrate solution with 0.2 g of Rh.

In the step of preparing the top coating layer's downstream portion slurry, the top coating layer's downstream portion slurry was a mixture of 25 g of a CZ composite oxide mixed with $La_2O_3$ and $Nd_2O_3$ ($CeO_2$:$ZrO_2$:$La_2O_3$:$Nd_2O_3$=44:49:2:5 (% by weight)) ($CeO_2$ content: 11 g), 25 g of alumina, an aqueous palladium nitrate solution with 1 g of Pd and an aqueous rhodium nitrate solution with 0.05 g of Rh.

Example 6

The procedure for fabricating the exhaust cleaning catalyst in Example 2 was carried out in the same manner as Example 2 except for the following and the resulting exhaust cleaning catalyst was used as a catalyst sample of Example 6.

In the step of preparing the bottom coating layer's upstream portion slurry, the bottom coating layer's upstream portion slurry was a mixture of 25 g of a CZ composite oxide mixed with $La_2O_3$ and $Nd_2O_3$ ($CeO_2$:$ZrO_2$:$La_2O_3$:$Nd_2O_3$=64:29:2:5 (% by weight)) ($CeO_2$ content: 16 g), 25 g of alumina and an aqueous rhodium nitrate solution with 0.2 g of Rh.

In the step of preparing the top coating layer's downstream portion slurry, the top coating layer's downstream portion slurry was a mixture of 25 g of a CZ composite oxide mixed with $La_2O_3$ and $Nd_2O_3$ ($CeO_2$:$ZrO_2$:$La_2O_3$:$Nd_2O_3$=64:29:2:5 (% by weight)) ($CeO_2$ content: 16 g), 25 g of alumina, an aqueous palladium nitrate solution with 1 g of Pd and an aqueous rhodium nitrate solution with 0.05 g of Rh.

Example 7

The procedure for fabricating the exhaust cleaning catalyst in Example 1 was carried out in the same manner as Example 1 except for the following and the resulting exhaust cleaning catalyst was used as a catalyst sample of Example 7.

In the step of preparing the bottom coating layer's upstream portion slurry, the bottom coating layer's upstream portion slurry was a mixture of 25 g of a CZ composite oxide mixed with $La_2O_3$ and $Nd_2O_3$ ($CeO_2$:$ZrO_2$:$La_2O_3$:$Nd_2O_3$=80:13:2:5 (% by weight)) ($CeO_2$ content: 20 g), 25 g of alumina and an aqueous rhodium nitrate solution with 0.2 g of Rh.

In the step of preparing the top coating layer's downstream portion slurry, the top coating layer's downstream portion slurry was a mixture of 25 g of a CZ composite oxide mixed with $La_2O_3$ and $Nd_2O_3$ ($CeO_2$:$ZrO_2$:$La_2O_3$:$Nd_2O_3$=80:13:2:5 (% by weight)) ($CeO_2$ content: 20 g), 25 g of alumina, an aqueous palladium nitrate solution with 1 g of Pd and an aqueous rhodium nitrate solution with 0.05 g of Rh.

Example 8

The procedure for fabricating the exhaust cleaning catalyst in Example 2 was carried out in the same manner as Example 2 except for the following and the resulting exhaust cleaning catalyst was used as a catalyst sample of Example 8.

The whole amount of the bottom coating layer's upstream portion slurry was applied to an area of the substrate up to 80 mm from its exhaust entrance-side end towards its exhaust exit-side end.

The whole amount of the bottom coating layer's downstream portion slurry was applied to an area of the substrate up to 20 mm from its exhaust exit-side end towards its exhaust entrance-side end.

The whole amount of the top coating layer's upstream portion slurry was applied to an area of the substrate up to 20 mm from its exhaust entrance-side end towards its exhaust exit-side end.

The whole amount of the top coating layer's downstream portion slurry was applied to an area of the substrate up to 80 mm from its exhaust exit-side end towards its exhaust entrance-side end.

Example 9

The procedure for fabricating the exhaust cleaning catalyst in Example 2 was carried out in the same manner as Example 2 except for the following and the resulting exhaust cleaning catalyst was used as a catalyst sample of Example 9.

The whole amount of the bottom coating layer's upstream portion slurry was applied to an area of the substrate up to 25 mm from its exhaust entrance-side end towards its exhaust exit-side end.

The whole amount of the bottom coating layer's downstream portion slurry was applied to an area of the substrate up to 75 mm from its exhaust exit-side end towards its exhaust entrance-side end.

The whole amount of the top coating layer's upstream portion slurry was applied to an area of the substrate up to 80 mm from its exhaust entrance-side end towards its exhaust exit-side end.

The whole amount of the top coating layer's downstream portion slurry was applied to an area of the substrate up to 20 mm from its exhaust exit-side end towards its exhaust entrance-side end.

Example 10

The procedure for fabricating the exhaust cleaning catalyst in Example 2 was carried out in the same manner as Example 2 except for the following and the resulting exhaust cleaning catalyst was used as a catalyst sample of Example 10.

In the bottom coating layer's upstream portion slurry and downstream portion slurry, the aqueous rhodium nitrate solution contained 0.25 g of Rh.

To the top coating layer's upstream portion slurry and downstream portion slurry, no rhodium nitrate aqueous solution was mixed in.

Example 11

The procedure for fabricating the exhaust cleaning catalyst in Example 2 was carried out in the same manner as Example 2 except for the following and the resulting exhaust cleaning catalyst was used as a catalyst sample of Example 11.

To the bottom coating layer's upstream portion slurry and downstream portion slurry, an aqueous diaminedinitroplatinum(II) solution with 0.1 g of Pt was further mixed in.

In the top coating layer's upstream portion slurry and downstream portion slurry, the palladium content in the aqueous palladium nitrate solution was 0.9 g.

Example 12

The exhaust cleaning catalyst of Example 12 has a three-layer structure.

First, as a substrate, the same substrate as the cordierite substrate of Example 1 was obtained.

Were mixed 25 g of a CZ composite oxide mixed with $La_2O_3$ and $Nd_2O_3$ as a carrier ($CeO_2$:$ZrO_2$:$La_2O_3$:$Nd_2O_3$=28:65:2:5 (% by weight)) ($CeO_2$ content: 7 g), 25 g of alumina and an aqueous rhodium nitrate solution with 0.1 g of Rh to prepare a bottom coating layer's upstream portion slurry.

Were mixed 25 g of a CZ composite oxide mixed with $La_2O_3$ and $Y_2O_3$ as a carrier ($CeO_2$:$ZrO_2$:$La_2O_3$:$Y_2O_3$=4:90:3:3 (% by weight)) ($CeO_2$ content: 1 g), 25 g of alumina and an aqueous rhodium nitrate solution with 0.1 g of Rh to prepare a bottom coating layer's downstream portion slurry.

Were mixed 15 g of a CZ composite oxide mixed with $La_2O_3$ as a carrier ($CeO_2$:$ZrO_2$:$La_2O_3$=5:90:5 (% by weight)) ($CeO_2$ content: 0.8 g), 15 g of alumina and an aqueous rhodium nitrate solution with 0.1 g of Rh to prepare a middle coating layer slurry.

Were mixed 25 g of a CZ composite oxide mixed with $La_2O_3$ and $Y_2O_3$ as a carrier ($CeO_2$:$ZrO_2$:$La_2O_3$:$Y_2O_3$=4:90:3:3 (% by weight)) ($CeO_2$ content: 1 g), 25 g of alumina, an aqueous palladium nitrate solution with 1 g of Pd and an aqueous rhodium nitrate solution with 0.05 g of Rh to prepare a top coating layer's upstream portion slurry.

Were mixed 25 g of a CZ composite oxide mixed with $La_2O_3$ and $Nd_2O_3$ as a carrier ($CeO_2$:$ZrO_2$:$La_2O_3$:$Nd_2O_3$=28:65:2:5 (% by weight)) ($CeO_2$ content: 7 g), 25 g of alumina, an aqueous palladium nitrate solution with 1 g of Pd and an aqueous rhodium nitrate solution with 0.05 g of Rh to prepare a top coating layer's downstream portion slurry.

Subsequently, the whole amount of the bottom coating layer's upstream portion slurry was applied to an area of a substrate up to 50 mm from its exhaust entrance-side end towards the exhaust exit-side end, allowed to dry at a temperature of 250° C. for one hour, and calcined at a temperature of 500° C. for one hour to form a bottom coating layer's upstream portion on the substrate.

The whole amount of the bottom coating layer's downstream portion slurry was applied to an area of the substrate up to 50 mm from its exhaust exit-side end towards the exhaust entrance-side end, allowed to dry at a temperature of 250° C. for one hour, and calcined at a temperature of 500° C. for one hour to form a bottom coating layer's downstream portion on the substrate.

The whole amount of the middle coating layer slurry was applied entirely over the bottom coating layer's upstream and downstream portions formed on the substrate, allowed to dry at a temperature of 250° C. for one hour, and calcined at a temperature of 500° C. for one hour to form a middle coating layer over the substrate.

The whole amount of the top coating layer's upstream portion slurry was applied to an area of the substrate up to 50 mm from its exhaust entrance-side end towards its exhaust exit-side end, allowed to dry at a temperature of 250° C. for one hour, and calcined at a temperature of 500° C. for one hour to form a top coating layer's upstream portion on the substrate.

The whole amount of the top coating layer's downstream portion slurry was applied to an area of the substrate up to 50 mm from its exhaust exit-side end towards its exhaust entrance-side end, allowed to dry at a temperature of 250° C. for one hour, and calcined at a temperature of 500° C. for one hour to form a top coating layer's downstream portion on the substrate.

The resulting exhaust cleaning catalyst having a three-layer structure was used as a catalyst sample of Example 12.

Comparative Example 1

The procedure for fabricating the exhaust cleaning catalyst in Example 1 was carried out in the same manner as Example 1 except for the following and the resulting exhaust cleaning catalyst was used as a catalyst sample of Comparative Example 1.

In the step of preparing the bottom coating layer's downstream portion slurry, the bottom coating layer's downstream portion slurry was a mixture of 25 g of a CZ composite oxide mixed with $La_2O_3$ and $Y_2O_3$ as a carrier ($CeO_2$:$ZrO_2$:$La_2O_3$:$Y_2O_3$=16:78:3:3 (% by weight)) ($CeO_2$ content: 4 g), 25 g of alumina and an aqueous rhodium nitrate solution with 0.2 g of Rh.

In the step of preparing the top coating layer's upstream portion slurry, the top coating layer's upstream portion slurry was a mixture of 25 g of a CZ composite oxide mixed with $La_2O_3$ and $Y_2O_3$ as a carrier ($CeO_2$:$ZrO_2$:$La_2O_3$:$Y_2O_3$=16:78:3:3 (% by weight)) ($CeO_2$ content: 4 g), 25 g of alumina, an aqueous palladium nitrate solution with 1 g of Pd and an aqueous rhodium nitrate solution with 0.05 g of Rh.

Comparative Example 2

The procedure for fabricating the exhaust cleaning catalyst in Example 2 was carried out in the same manner as Example 2 except for the following and the resulting exhaust cleaning catalyst was used as a catalyst sample of Comparative Example 2.

In the step of preparing the bottom coating layer's upstream portion slurry, the bottom coating layer's downstream portion slurry in Example 3 was used as the bottom coating layer's upstream portion slurry.

In the step of preparing the top coating layer's downstream portion slurry, the top coating layer's upstream portion slurry in Example 3 was used as the top coating layer's downstream portion slurry.

Comparative Example 3

The procedure for fabricating the exhaust cleaning catalyst in Example 1 was carried out in the same manner as Example 1 except for the following and the resulting exhaust cleaning catalyst was used as a catalyst sample of Comparative Example 3.
In the step of preparing the bottom coating layer's upstream portion slurry, the bottom coating layer's upstream portion slurry was a mixture of 30.1 g of a CZ composite oxide mixed with $La_2O_3$ and $Nd_2O_3$ as a carrier ($CeO_2$:$ZrO_2$:$La_2O_3$:$Nd_2O_3$=83:10:2:5 (% by weight)) ($CeO_2$ content: 25 g), 19.9 g of alumina and an aqueous rhodium nitrate solution with 0.2 g of Rh.
In the step of preparing the top coating layer's downstream portion slurry, the top coating layer's downstream portion slurry was a mixture of 30.1 g of a CZ composite oxide mixed with $La_2O_3$ and $Nd_2O_3$ as a carrier ($CeO_2$:$ZrO_2$:$La_2O_3$:$Nd_2O_3$=83:10:2:5 (% by weight)) ($CeO_2$ content: 25 g), 19.9 g of alumina, an aqueous palladium nitrate solution with 1 g of Pd and an aqueous rhodium nitrate solution with 0.05 g of Rh.

Comparative Example 4

The procedure for fabricating the exhaust cleaning catalyst in Comparative Example 1 was carried out in the same manner as Comparative Example 1 except for the following and the resulting exhaust cleaning catalyst was used as a catalyst sample of Comparative Example 4.
In the step of preparing the bottom coating layer's upstream portion slurry, the bottom coating layer's downstream portion slurry in Example 2 was used as the bottom coating layer's upstream portion slurry.
In the step of preparing the top coating layer's downstream portion slurry, the top coating layer's upstream portion slurry in Example 2 was used as the top coating layer's downstream portion slurry.

Comparative Example 5

The procedure for fabricating the exhaust cleaning catalyst in Example 2 was carried out in the same manner as Example 2 except for the following and the resulting exhaust cleaning catalyst was used as a catalyst sample of Comparative Example 5.
The whole amount of the bottom coating layer's upstream portion slurry was applied to an area of the substrate up to 90 mm from its exhaust entrance-side end towards its exhaust exit-side end.
The whole amount of the bottom coating layer's downstream portion slurry was applied to an area of the substrate up to 10 mm from its exhaust exit-side end towards its exhaust entrance-side end.
The whole amount of the top coating layer's upstream portion slurry was applied to an area of the substrate up to 10 mm from its exhaust entrance-side end towards its exhaust exit-side end.
The whole amount of the top coating layer's downstream portion slurry was applied to an area of the substrate up to 90 mm from its exhaust exit-side end towards its exhaust entrance-side end.

Comparative Example 6

The procedure for fabricating the exhaust cleaning catalyst in Example 2 was carried out in the same manner as Example 2 except for the following and the resulting exhaust cleaning catalyst was used as a catalyst sample of Comparative Example 6.
The whole amount of the bottom coating layer's upstream portion slurry was applied to an area of the substrate up to 15 mm from its exhaust entrance-side end towards its exhaust exit-side end.
The whole amount of the bottom coating layer's downstream portion slurry was applied to an area of the substrate up to 85 mm from its exhaust exit-side end towards its exhaust entrance-side end.
The whole amount of the top coating layer's upstream portion slurry was applied to an area of the substrate up to 90 mm from its exhaust entrance-side end towards its exhaust exit-side end.
The whole amount of the top coating layer's downstream portion slurry was applied to an area of the substrate up to 10 mm from its exhaust exit-side end towards its exhaust entrance-side end.

Comparative Example 7

The procedure for fabricating the exhaust cleaning catalyst in Comparative Example 4 was carried out in the same manner as Comparative Example 4 except for the following and the resulting exhaust cleaning catalyst was used as a catalyst sample of Comparative Example 7.
In the bottom coating layer's upstream portion slurry and downstream portion slurry, the Rh content in the aqueous rhodium nitrate solution was 0.25 g.
To the top coating layer's upstream portion slurry and downstream portion slurry, no aqueous rhodium nitrate solution was mixed in.

Comparative Example 8

The procedure for fabricating the exhaust cleaning catalyst in Comparative Example 4 was carried out in the same manner as Comparative Example 4 except for the following and the resulting exhaust cleaning catalyst was used as a catalyst sample of Comparative Example 8.
To the bottom coating layer's upstream portion slurry and downstream portion slurry, an aqueous diamminedinitroplatinum(II) solution with 0.1 g of Pt was further mixed in.
In the top coating layer's upstream portion slurry and downstream portion slurry, the palladium content in the aqueous palladium nitrate solution was 0.9 g.

Comparative Example 9

The exhaust cleaning catalyst of Comparative Example 9 has a three-layer structure. In Comparative Example 9, the procedure for fabricating the exhaust cleaning catalyst in Example 12 was carried out in the same manner as Example 12 except for the following and the resulting exhaust cleaning catalyst was used as a catalyst sample of Comparative Example 9.
In the step of preparing the bottom coating layer's upstream portion slurry, the bottom coating layer's downstream portion slurry in Example 12 was used as the bottom coating layer's upstream portion slurry.
In the step of preparing the bottom coating layer's downstream portion slurry, the bottom coating layer's downstream portion slurry was a mixture of 25 g of a CZ composite oxide mixed with $La_2O_3$ and $Y_2O_3$ as a carrier ($CeO_2$:$ZrO_2$:$La_2O_3$:$Y_2O_3$=16:78:3:3 (% by weight)) ($CeO_2$ content: 4 g), 25 g of alumina and an aqueous rhodium nitrate solution with 0.1 g of Rh.

In the step of preparing the top coating layer's upstream portion slurry, the top coating layer's upstream portion slurry was a mixture of 25 g of a CZ composite oxide mixed with $La_2O_3$ and $Y_2O_3$ as a carrier ($CeO_2$:$ZrO_2$:$La_2O_3$:$Y_2O_3$=16:78:3:3 (% by weight)) ($CeO_2$ content: 4 g), 25 g of alumina, an aqueous palladium nitrate solution with 1 g of Pd and an aqueous rhodium nitrate solution with 0.05 g of Rh.

In the step of preparing the top coating layer's downstream portion slurry, the top coating layer's upstream portion slurry in Example 12 was used as the top coating layer's downstream portion slurry.

Comparative Example 10

In the exhaust cleaning catalyst of Comparative Example 10, the $CeO_2$ content is the same between the top coating layer's upstream portion and downstream portion. In Comparative Example 10, the procedure for fabricating the exhaust cleaning catalyst in Example 1 was carried out in the same manner as Example 1 except for the following and the resulting exhaust cleaning catalyst was used as a catalyst sample of Comparative Example 10.

As the top coating layer's upstream portion slurry and downstream portion slurry; was used a mixture of 25 g of a CZ composite oxide mixed with $La_2O_3$ and $Nd_2O_3$ as a carrier ($CeO_2$:$ZrO_2$:$La_2O_3$:$Nd_2O_3$=14:79:2:5 (% by weight)) ($CeO_2$ content: 3.5 g), 25 g of alumina, an aqueous palladium nitrate solution with 1 g of Pd and an aqueous rhodium nitrate solution with 0.05 g of Rh.

Comparative Example 11

In the exhaust cleaning catalyst of Comparative Example 11, the $CeO_2$ content is the same between the bottom coating layer's upstream portion and bottom coating layer's downstream portion. In Comparative Example 11, the procedure for fabricating the exhaust cleaning catalyst in Example 1 was carried out in the same manner as Example 1 except for the following and the resulting exhaust cleaning catalyst was used as a catalyst sample of Comparative Example 11.

As the bottom coating layer's upstream portion slurry and downstream portion slurry, was used a mixture of 25 g of a CZ composite oxide mixed with $La_2O_3$ and $Nd_2O_3$ as a carrier ($CeO_2$:$ZrO_2$:$La_2O_3$:$Nd_2O_3$=14:79:2:5 (% by weight)) ($CeO_2$ content: 3.5 g), 25 g of alumina and an aqueous rhodium nitrate solution with 0.2 g of Rh.

Table 1 shows the summary of the catalyst samples of the exhaust cleaning catalysts in Examples 1 to 12 and Comparative Examples 1 to 11. In Table 1, the $CeO_2$ content is per liter of catalyst volume and the unit is g/L. For the top coating layer, the (upstream/downstream) ratio of $CeO_2$ content in upstream portion to $CeO_2$ content in downstream portion is given. For the bottom coating layer, the (downstream/upstream) ratio of $CeO_2$ content in downstream portion to $CeO_2$ content in upstream portion is given. The $CeO_2$ content of the catalyst coating layer indicates the total of the $CeO_2$ content in the bottom coating layer's upstream and downstream portions and the top coating layer's upstream and downstream portions all combined.

TABLE 1

| | Top coating layer's $CeO_2$ content (g/L) | | | Bottom coating layer's $CeO_2$ content (g/L) | | | Catalyst coating layer's $CeO_2$ content (g/L) | Top coating layer's length (%) | | Bottom coating layer's length (%) | |
|---|---|---|---|---|---|---|---|---|---|---|---|
| | Up | Down | Up/Down | Up | Down | Up/Down | | Up | Down | Up | Down |
| Ex. 1 | 0 | 7 | 0.00 | 7 | 0 | 0.00 | 14 | 50 | 50 | 50 | 50 |
| Ex. 2 | 1 | 7 | 0.14 | 7 | 1 | 0.14 | 16 | 50 | 50 | 50 | 50 |
| Ex. 3 | 2 | 7 | 0.29 | 7 | 2 | 0.29 | 18 | 50 | 50 | 50 | 50 |
| Ex. 4 | 1 | 4 | 0.25 | 4 | 1 | 0.25 | 10 | 50 | 50 | 50 | 50 |
| Ex. 5 | 1 | 11 | 0.09 | 11 | 1 | 0.09 | 24 | 50 | 50 | 50 | 50 |
| Ex. 6 | 1 | 16 | 0.06 | 16 | 1 | 0.06 | 34 | 50 | 50 | 50 | 50 |
| Ex. 7 | 0 | 20 | 0.00 | 20 | 0 | 0.00 | 40 | 50 | 50 | 50 | 50 |
| Ex. 8 | 1 | 7 | 0.14 | 7 | 1 | 0.14 | 16 | 20 | 80 | 80 | 20 |
| Ex. 9 | 1 | 7 | 0.14 | 7 | 1 | 0.14 | 16 | 80 | 20 | 25 | 75 |
| Ex. 10 | 1 | 7 | 0.14 | 7 | 1 | 0.14 | 16 | 50 | 50 | 50 | 50 |
| Ex. 11 | 1 | 7 | 0.14 | 7 | 1 | 0.14 | 16 | 50 | 50 | 50 | 50 |
| Ex. 12 | 1 | 7 | 0.14 | 7 | 1 | 0.14 | 16.8 | 50 | 50 | 50 | 50 |
| Comp. Ex. 1 | 4 | 7 | 0.57 | 7 | 4 | 0.57 | 22 | 50 | 50 | 50 | 50 |
| Comp. Ex. 2 | 1 | 2 | 0.50 | 2 | 1 | 0.50 | 6 | 50 | 50 | 50 | 50 |
| Comp. Ex. 3 | 0 | 25 | 0.00 | 25 | 0 | 0.00 | 50 | 50 | 50 | 50 | 50 |
| Comp. Ex. 4 | 4 | 1 | 4.00 | 1 | 4 | 4.00 | 10 | 50 | 50 | 50 | 50 |
| Comp. Ex. 5 | 1 | 7 | 0.14 | 7 | 1 | 0.14 | 16 | 10 | 90 | 90 | 10 |
| Comp. Ex. 6 | 1 | 7 | 0.14 | 7 | 1 | 0.14 | 16 | 90 | 10 | 15 | 85 |
| Comp. Ex. 7 | 4 | 1 | 4.00 | 1 | 4 | 4.00 | 10 | 50 | 50 | 50 | 50 |
| Comp. Ex. 8 | 4 | 1 | 4.00 | 1 | 4 | 4.00 | 10 | 50 | 50 | 50 | 50 |
| Comp. Ex. 9 | 4 | 1 | 4.00 | 1 | 4 | 4.00 | 10.8 | 50 | 50 | 50 | 50 |
| Comp. Ex. 10 | 3.5 | 3.5 | 1.00 | 7 | 0 | 0.00 | 14 | 50 | 50 | 50 | 50 |
| Comp. Ex. 11 | 0 | 7 | 0.00 | 3.5 | 3.5 | 1.00 | 14 | 50 | 50 | 50 | 50 |

(Up: upstream portion; Down: downstream portion)

[Evaluations]

After enduring an approximately 100,000 km drive, each catalyst sample of the exhaust cleaning catalysts according to Examples 1 to 12 and Comparative Examples 1 to 11 was installed in an idling-stop vehicle having an engine with 1.0 L displacement. The vehicles installed with the respective catalyst samples were driven in JC08 mode. The total amount of NMHC and $NO_X$ emissions (g/km) in each catalyst sample during the drive was measured. The results are shown in Table 2. NMHC refers to HC free of methane.

TABLE 2

| | Emission values | | | Emission values | |
|---|---|---|---|---|---|
| | NMHC (g/km) | NOx (g/km) | | NMHC (g/km) | NOx (g/km) |
| Ex. 1 | 0.008 | 0.007 | Comp. Ex. 1 | 0.015 | 0.013 |
| Ex. 2 | 0.008 | 0.007 | Comp. Ex. 2 | 0.014 | 0.014 |
| Ex. 3 | 0.009 | 0.008 | Comp. Ex. 3 | 0.014 | 0.013 |
| Ex. 4 | 0.007 | 0.008 | Comp. Ex. 4 | 0.014 | 0.017 |
| Ex. 5 | 0.008 | 0.006 | Comp. Ex. 5 | 0.013 | 0.012 |
| Ex. 6 | 0.008 | 0.007 | Comp. Ex. 6 | 0.013 | 0.013 |
| Ex. 7 | 0.009 | 0.009 | Comp. Ex. 7 | 0.014 | 0.020 |
| Ex. 8 | 0.009 | 0.008 | Comp. Ex. 8 | 0.014 | 0.016 |
| Ex. 9 | 0.008 | 0.008 | Comp. Ex. 9 | 0.014 | 0.016 |
| Ex. 10 | 0.008 | 0.009 | Comp. Ex. 10 | 0.014 | 0.016 |
| Ex. 11 | 0.009 | 0.006 | Comp. Ex. 11 | 0.016 | 0.015 |
| Ex. 12 | 0.007 | 0.006 | | | |

Herein, when the NMHC and $NO_X$ emission values were 0.01 g/km or less, respectively, the catalytic activity is rated good.

In the top coating layer and bottom coating layer, examples in which the upstream portion and downstream portion are equal in length are discussed first.

As shown in Table 2, each emission values was below 0.01 g/km in Examples 1 to 7 and 10 to 12 with each satisfying both of the following conditions (1) and (2):

(1) the $CeO_2$ content in the top coating layer's upstream portion being less than the $CeO_2$ content in the top coating layer's downstream portion;

(2) the $CeO_2$ content in the bottom coating layer's downstream portion being less than the $CeO_2$ content in the bottom coating layer's upstream portion.

On the other hand, each emission values was above 0.01 g/km in Comparative Examples 4 and 7 to 11 not satisfying (1) and/or (2).

The respective emission values were below 0.01 g/km in Examples 1 to 3 in each of which the $CeO_2$ content per liter of catalyst volume was 0 g/L to 2 g/L each in the top coating layer's upstream portion and bottom coating layer's downstream portion.

On the other hand, each emission values was above 0.01 g/km in Comparative Examples 1 and 4 having 4 g of $CeO_2$ per liter of catalyst volume each in the top coating layer's upstream portion and in the bottom coating layer's downstream portion. This can be because at the time of engine restart, the $NO_X$-cleaning activities were low in the top coating layer's upstream portion and the HC-cleaning activities were low in the bottom coating layer's downstream portion.

Thus, with the $CeO_2$ content per liter of catalyst volume in the top coating layer's upstream portion and bottom coating layer's downstream portion being each 0 g/L to 2 g/L, the $NO_X$-cleaning activities (at the time of engine restart) and the HC-cleaning activities can be increased.

In Example 4, the $CeO_2$ content per liter of catalyst volume in the bottom coating layer's upstream portion and the top coating layer's downstream portion was each 4 g/L; and each emission values was then below 0.01 g/km.

On the other hand, in Comparative Examples 2 and 4, the $CeO_2$ content per liter of catalyst volume in the bottom coating layer's upstream portion and the top coating layer's downstream portion was 2 g/L or less; and each emission values was then above 0.01 g/km for these. This may be because with the low $CeO_2$ content each in the bottom coating layer's upstream portion and the top coating layer's downstream portion, the $NO_X$-cleaning activities and HC-cleaning activities becomes low during normal traveling.

In Examples 5 to 7, the $CeO_2$ content in the catalyst coating layer was 40 g/L and each emission values was then below 0.01 g/km.

On the contrary, in Comparative Example 3, the $CeO_2$ content in the catalyst coating layer was 50 g/L and each emission values was then above 0.01 g/km.

Based on these, it is favorable that the $CeO_2$ content per liter of catalyst volume in the bottom coating layer's upstream portion and the top coating layer's downstream portion is each 4 g/L or greater, with the $CeO_2$ content in the catalyst coating layer being 40 g/L or less.

The length ratio of upstream portion to downstream portion is discussed next.

In Examples 8 and 9, the length of the top coating layer's upstream portion in the exhaust flow direction accounts for 20% to 80% of the full length of the top coating layer from the exhaust entrance-side end along this direction; and the length of the top coating layer's downstream portion in the exhaust flow direction accounts for 20% to 80% of the full length from the exhaust exit-side end. In Examples 8 and 9, the length of the bottom coating layer's upstream portion in the exhaust flow direction accounts for 25% to 80% of the full length of the bottom coating layer from its exhaust entrance-side end along this direction; and the length of the bottom coating layer's downstream portion in the exhaust flow direction accounts for 20% to 75% of the full length of the bottom coating layer from the exhaust exit-side end along this direction. In Examples 8 and 9 being in these ranges, each emission values was below 0.01 g/km.

On the contrary, in Comparative Examples 5 and 6 being outside these ranges, each emission value was above 0.01 g/km.

Accordingly, with the length of each portion in the catalyst coating layer being in these ranges, the $NO_X$-cleaning activities and HC-cleaning activities can be increased.

As shown in Examples 10 and 11 as well as in Comparative Examples 7 and 8, even if the type of precious metal catalyst and its content in Example 2 and Comparative Example 4 are modified, similar effects can be obtained when the $CeO_2$ content in the respective upstream and downstream portions is in the aforementioned ranges.

As shown Example 12 and Comparative Example 9, even if the exhaust cleaning catalyst has a catalyst coating layer in a three-layer structure, similar effects can be obtained with the $CeO_2$ content in the respective upstream and downstream portions being in the aforementioned ranges.

Although specific embodiments of the present invention have been described in detail above, these are merely for illustrations and do not limit the scope of claims. The invention disclosed herein includes various modifications and changes made to the specific embodiments illustrated above.

REFERENCE SIGNS LIST 1 exhaust cleaning system
2 internal combustion engine (engine)
3 exhaust manifold
4 exhaust pipe
5 ECU
7, 7A exhaust cleaning catalysts
10 substrate (porous substrate)

12 cell(s)
16 partition(s)
30, 30A catalyst coating layers
40 bottom coating layer
41 bottom coating layer's upstream portion
42 bottom coating layer's downstream portion
50 top coating layer
51 top coating layer's upstream portion
52 top coating layer's downstream portion
60 middle coating layer

The invention claimed is:

1. An exhaust cleaning catalyst placed in an exhaust path from an internal combustion engine to clean exhaust expelled from the internal combustion engine,
   the catalyst comprising a porous substrate and a catalyst coating layer formed on the porous substrate,
   the catalyst coating layer having a carrier and a precious metal catalyst carried by the carrier,
   the carrier comprising an OSC material that comprises at least $CeO_2$, and
   the catalyst coating layer being constituted in its thickness direction with multiple coating layers that includes at least two layers having different compositions, wherein
   the top coating layer forming the uppermost layer located at the outermost surface among the multiple coating layers has
      a top coating layer's upstream portion that includes at least 20% of the full length of the top coating layer from its exhaust entrance-side end along the exhaust flow direction, and
      a top coating layer's downstream portion that includes at least 20% of the full length of the top coating layer from its exhaust exit-side end along the exhaust flow direction
   the top coating layer's downstream portion comprises the $CeO_2$,
   the $CeO_2$ content in the top coating layer's upstream portion is less than the $CeO_2$ content in the top coating layer's downstream portion, and
   the bottom coating layer forming the lowest layer near the porous substrate among the multiple coating layers has
      a bottom coating layer's upstream portion that includes at least 20% of the full length of the bottom coating layer from its exhaust entrance-side end along the exhaust flow direction, and
      a bottom coating layer's downstream portion that includes at least 20% of the full length of the bottom coating layer from its exhaust exit-side end along the exhaust flow direction,
   the bottom coating layer's upstream portion comprises the $CeO_2$, and
   the $CeO_2$ content in the bottom coating layer's downstream portion is less than the $CeO_2$ content in the bottom coating layer's upstream portion.

2. The exhaust cleaning catalyst according to claim 1, wherein the $CeO_2$ content per liter of catalyst volume in the catalyst coating layer is 10 g/L to 40 g/L.

3. The exhaust cleaning catalyst according to claim 1, wherein the $CeO_2$ content per liter of catalyst volume in the top coating layer's upstream portion is 0 to 2 g/L.

4. The exhaust cleaning catalyst according to claim 1, wherein the $CeO_2$ content per liter of catalyst volume in the bottom coating layer's downstream portion is 0 to 2 g/L.

5. The exhaust cleaning catalyst according to claim 1, wherein the $CeO_2$ content per liter of catalyst volume in the top coating layer's downstream portion and in the bottom coating layer's upstream portion is each 4 g/L or greater.

6. The exhaust cleaning catalyst according to claim 1, wherein with the full length of the top coating layer in the exhaust flow direction being 100, the (upstream/downstream) ratio of length of top coating layer's upstream portion along the exhaust flow direction to length of bottom coating layer's downstream portion along the exhaust flow direction is 20/80 to 80/20.

7. The exhaust cleaning catalyst according to claim 1, wherein with the full length of the bottom coating layer in the exhaust flow direction being 100, the (upstream/downstream) ratio of length of bottom coating layer's upstream portion along the exhaust flow direction to length of bottom coating layer's downstream portion along this direction is 25/75 to 80/20.

8. The exhaust cleaning catalyst according to claim 1, wherein the precious metal catalyst is at least one species among Pt, Pd and Rh.

9. The exhaust cleaning catalyst according to claim 8, wherein the top coating layer comprises Pd and Rh as the precious metal catalyst.

10. The exhaust cleaning catalyst according to claim 1, wherein
   with the $CeO_2$ content in the top coating layer's downstream portion being 1, the $CeO_2$ content in the top coating layer's upstream portion is less than 0.3; and
   with the $CeO_2$ content in the bottom coating layer's upstream portion being 1, the $CeO_2$ content in the bottom coating layer's downstream portion is less than 0.3.

* * * * *